J. A. CARLSON, DEC'D.
C. A. CARLSON, ADMINISTRATOR.
LINE SQUARE.
APPLICATION FILED JUNE 7, 1918.

1,327,198.

Patented Jan. 6, 1920.

Witnesses

Inventor
J. A. Carlson
By Victor J. Evans
Attorney

UNITED STATES PATENT OFFICE.

JOHN A. CARLSON, OF IDAHO FALLS, IDAHO; C. A. CARLSON, ADMINISTRATOR OF JOHN A. CARLSON, DECEASED, ASSIGNOR TO EMILIA A. CARLSON, OF IDAHO FALLS, IDAHO.

LINE-SQUARE.

1,327,198.　　　　Specification of Letters Patent.　　Patented Jan. 6, 1920.

Application filed June 7, 1918. Serial No. 238,699.

*To all whom it may concern:*

Be it known that I, JOHN A. CARLSON, a naturalized citizen of the United States, residing at Idaho Falls, in the county of Bonneville and State of Idaho, have invented new and useful Improvements in Line-Squares, of which the following is a specification.

This invention relates to new and useful improvements in line squares, and the principal object of the invention is to provide a device for facilitating the proper arrangement of the lines marking the locations of the foundations.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

As shown in these views the device comprises a circular member 1 formed of any suitable material and carrying the spokes 2 radiating from a common center as shown. The alternate spokes are spaced 90° from each other while the other spokes are located 45° from the said alternate spokes. As shown two of the spokes, which are diametrically arranged are slightly grooved to receive the chalk line. At diametrically opposite points on the member 1 adjacent the outer edges of the spokes are arranged springs 3, each spring being composed of an elongated member having a V-shaped recess 3' midway its ends and having one end secured to the member 1 and its other end provided with an enlargement. These springs are adapted to engage the chalk line 4 so as to hold the square on said line. The line is passed under the enlargement and into the V-shaped recesses so that the square is suspended from said line. It will thus be seen that the line engages with the grooves in the diametrically arranged spokes so that a pair of spokes is located at right angles to the line.

Figure 1:
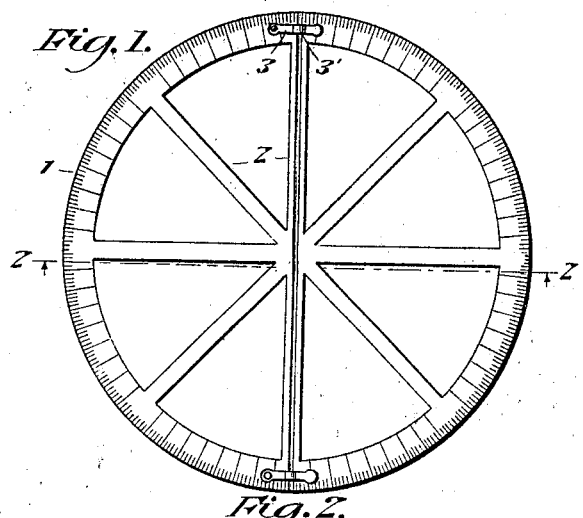
Figure 1 is a face view of the device.
Figure 2:
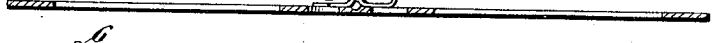
Fig. 2 is a sectional view thereof on the line 2—2 of Fig. 1.
Figure 3:
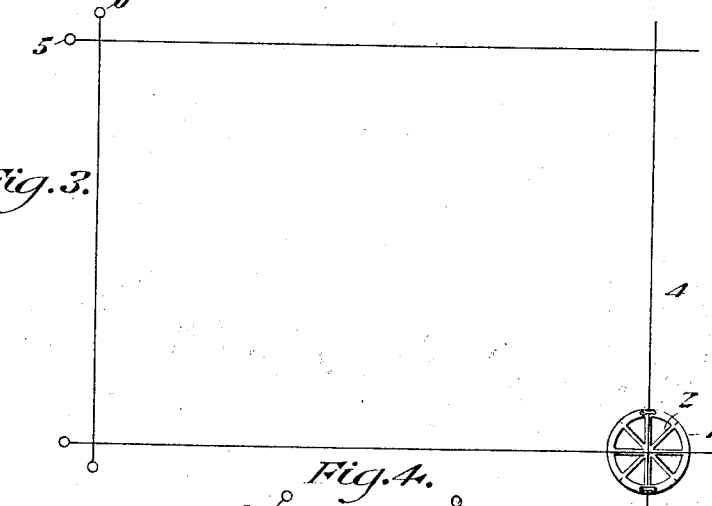
Fig. 3 shows the device in use for locating the lines of a rectangular foundation.

Fig. 3 shows the device being used to locate the line for a rectangular foundation. As is usual in laying out the foundations stakes are driven at the points 5 and 6 at each corner and the lines 4 stretched from post to post, as shown. By placing my device at the corner a true right angle may be found so that the proper placing of the lines may be secured.

Figure 4:
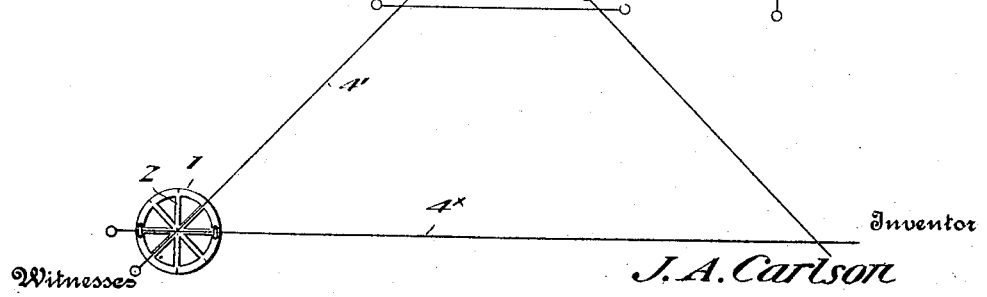
Fig. 4 is a like view showing the device used for the placing of a line at 45° to the main line.

In Fig. 4 the device is shown as being used for the placing of a line 4' which is located at an angle of 45° to the main line 4×. In this case the device is placed on the main line 4× and the line 4' placed above the spokes arranged between the two diametrically arranged spokes.

I prefer to make the device of a light metal such as aluminum and to mark the degrees of a circle on the member 1.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. A device of the class described comprising a circular member, spoke members therein, and string engaging clips located at diametrically arranged points on said circular member.

2. A device of the class described comprising a circular member, groove spoke members carried thereby, and string engaging means located above one of the diametrically arranged spoke members.

3. A device of the class described comprising a circular member having the degrees of a circle marked thereon, spoke members carried by said member, two of said spoke members being grooved and diametrically arranged within the circular member and the other members being located midway between the afore-mentioned spoke members, and spring supporting means on the circular member and located above the ends of the diametrically arranged spoke members.

In testimony whereof I affix my signature.

JOHN A. CARLSON.